United States Patent [19]

Rayner et al.

[11] 4,223,935

[45] Sep. 23, 1980

[54] TOOLS

[75] Inventors: Basil M. Rayner, London; David C. Evans, Sutton, both of England

[73] Assignee: Beachcroft Concrete Partitions Limited, London, England

[21] Appl. No.: 4,238

[22] Filed: Jan. 17, 1979

[30] Foreign Application Priority Data

Jan. 18, 1978 [GB] United Kingdom ................. 2041/78

[51] Int. Cl.$^3$ ............................................. B65G 7/12
[52] U.S. Cl. ........................................ 294/16; 294/62
[58] Field of Search ................... 294/16, 62, 63 B, 28, 294/31, 103 R, 92, 49, 106, 118, 86.24, 93, 95, 103 CG; 224/45 F

[56] References Cited

U.S. PATENT DOCUMENTS

| 1,495,179 | 5/1924 | Hoffer | 294/16 |
| 2,578,072 | 12/1951 | Kargol | 294/62 |

Primary Examiner—James B. Marbert
Attorney, Agent, or Firm—Edwin E. Greigg

[57] ABSTRACT

The invention relates to a tool for lifting a component such as a building block and comprises a support having a contiguous lower abutment surface, a plurality of engaging members extending beneath the support and adapted to be entered into a recess in the component, at least one of the members being movable and a handle means movable with respect to the support and operatively connected with the movable engaging member, so that on lifting the handle the engaging members engage the adjacent wall of the recess with a force proportional to the weight of the component.

5 Claims, 2 Drawing Figures

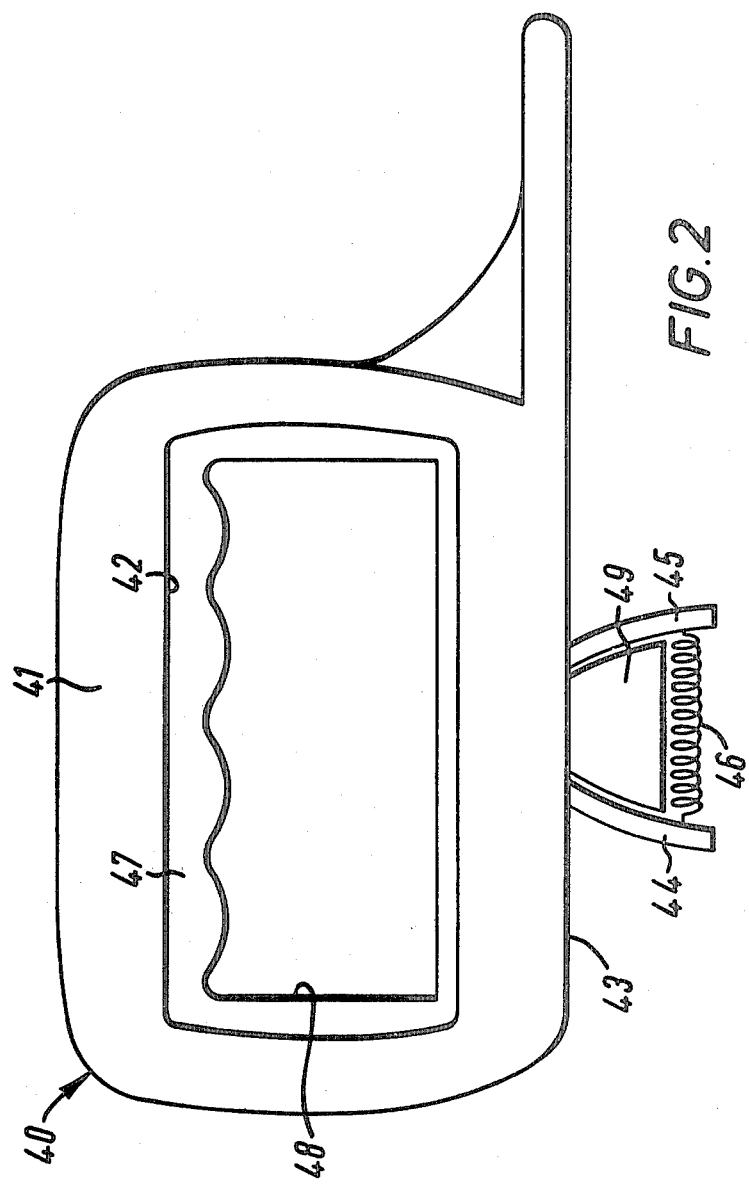

TOOLS

DESCRIPTION

The present invention relates to hand tools for use in the building trade, and has particular reference to a hand tool suitable for use in lifting a component, such as a block or the like.

The traditional building block is the familiar brick which is small enough to be handled manually without difficulty. With the advent of larger blocks such, for example, as breeze blocks and party-wall blocks, the relative size of the block makes it difficult to handle the block single-handed and in consequence, an operative when laying a wall of these blocks needs to prepare his cement or mortar in the location to which the block is applied and then to use both hands to lift the block in to position.

With ordinary breeze blocks or insulated building blocks and the like this is not a particular problem, but with party wall blocks the weight and dimensions of the block are sufficient to make, in some instances, the lift a difficult one.

There is, therefore, a need for a means of lifting a block such as a breeze, insulating or party wall block with one hand to enable the familiar builder's trowel to be wielded with the other.

According to the present invention, therefore, there is provided a tool for lifting a component which tool comprises a support having a contiguous lower abutment surface, a plurality of engaging members extending beneath said support and adapted to be entered into a recess in said component at least one of said members being movable, and handle means movably connected with said support and operatively connected with said movable engaging member, whereby on lifting the handle, the members engage the adjacent wall of the recess with a force proportional to the weight of the component.

The support may carry a pair of engagement members which move outwardly one with respect to the other. At least one of the members may be pivotally mounted relative to the support and the handle may be disposed in substantially parallel spaced relationship with the support.

In an alternative embodiment first handle may be mounted on said support relative to a second fixed handle and the first handle may be pivotally connected to an extension portion of the second handle.

An intermediate linkage may be effective between the handle and the movable member. In the alternative a detent on the handle may be engaged directly with an abutment on said movable member, the arrangement being as to provide a sliding interconnection therebetween. The first handle may be adapted to the slidably mounted in the second handle; each engaging member may be pivotally mounted relative to the support and wedge means may be disposed between the members, the arrangment being such that on lifting the slidable handle the wedge means is moved upwardly between the pivoted members to urge the same apart and to engage the adjacent wall of the recess to force the extension portion away from the components. The wedge portion may be integral with the slidable handle.

Following is a description, by way of example only and with reference to the accompanying drawings, of embodiments in accordance with the present invention.

In the drawings:

FIG. 2 is a diagrammatic view of another embodiment.

Figure 1:
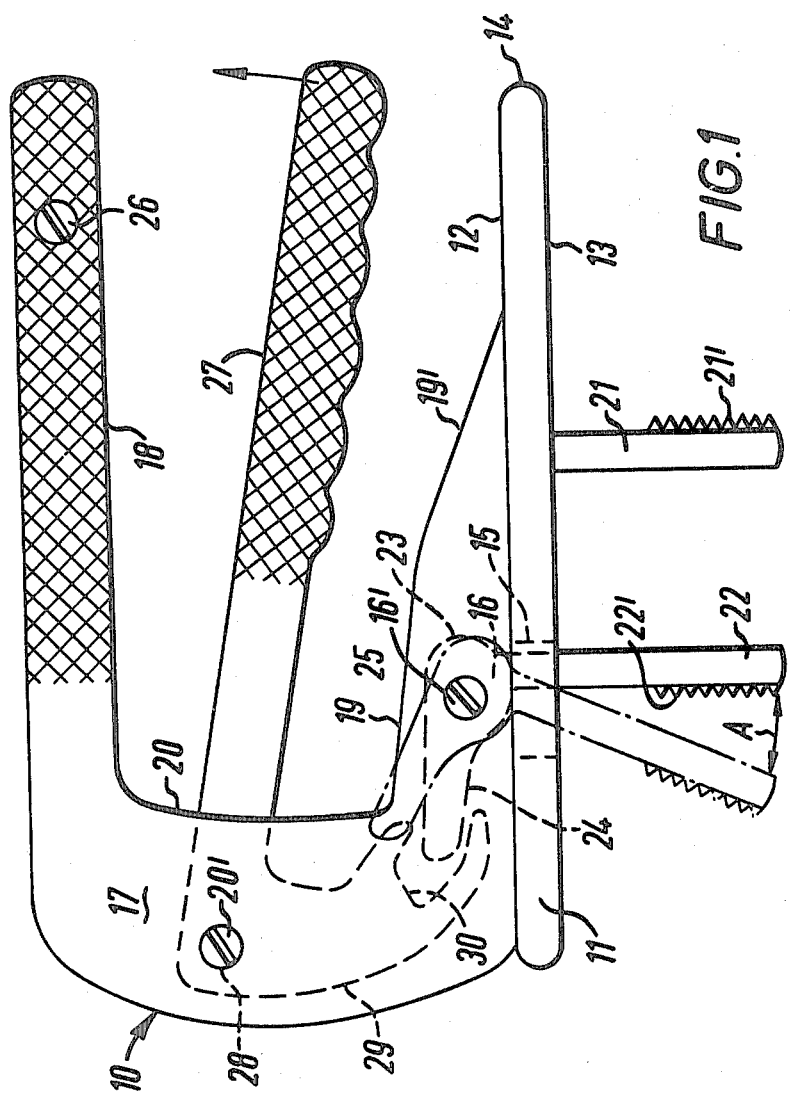
FIG. 1 is a diagrammatic view of one embodiment.

Referring to FIG. 1 of the drawings, there is shown a tool 10 comprising a plate 11 having an upper surface 12, a lower abutment surface 15 and a circumferential wall 14. The plate 11 is provided with an elongate slot 15. The plate 11 has upstanding from the upper surface 12 thereof a post 16 located adjacent an end of the plate having a pin 16' extending outwardly from an upper end portion thereof at right angles to a longitudinal axis of the post. The plate 11 also has upstanding from the upper surface 12 thereof a substantially U-shape handle 17, comprising a pair of spaced parallel arms 18 and 19 and a connecting portion 20 connecting the arms 18 and 19, the handle 17 being arranged such that the arms 18 and 19 extend parallel to the upper surface 12 of the plate 11. The plate 11 has depending from the lower abutment surface 13 thereof an elongate arm 21 spaced from the slot 15 in a longitudinal direction of the slot 15. The slot 15 has extending therethrough an elongated arm 22 having an enlarged upper end portion 23 and a lug 24 extending in a direction substantially at right angles to a central longitudinal axis of the arm 22, the upper end portion 23 of the arm 22 having an aperture 25 therein for receiving therein the pin 16' so that when the arm 22 extends in spaced parallel relationship to the arm 21, the lug 24 extends parallel to the upper surface 12 in a direction away from the arm 21. The arm 22 therefore is pivotally mounted on the pin 16' and is adapted to pivot on the pin 16' through the angle A shown in FIG. 1 and thereby to increase the distance between the arms 21 and 22. The arms 21 and 22 each are provided with serrated portions 21' and 22' on outwardly facing surfaces thereof remote from one another.

The U-shape handle 17 is arranged such that the arm 18 is remote from the upper surface 12 of the plate 11. The arm 18 is provided with a stud 26 extending outwardly therefrom in a direction transverse to a longitudinal axis thereof and at an end portion thereof remote from the connecting portion 20. The arm 19 is provided with a surface 19' facing the arm 18 the surface 19' tapering towards the upper surface 12 of the plate 11. The connecting portion 20 is provided with a pin 20' extending outwardly therefrom in a direction parallel to the upper surface 12 of the plate 11.

The pin 20' has pivotally mounted thereon one end portion of an elongated handle 27, the said end portion having an aperture 28 through which the pin 20' extends thereby to receive therein the handle 27 so that the handle 27 extends in a plane parallel to a plane extending perpendicular to the upper surface 12 of the plate 11 and containing the handle 17. The handle 27 has an outwardly and downwardly curved arm 29 extending from the said end portion thereof, the arm 29 terminating in a recess 30. The arm 29 is proportioned such that an end of the lug 24 remote from the end portion 23 of the arm 22 is received in the recess 30.

The tool 10 is used for manipulating bricks (not shown) having at least one aperture therein. The tool 10 is held by the arm 18 and the brick is arranged such that a surface having an aperture therein is uppermost. The tool 10 then is lowered towards the said surface and the arm 27 pivots downwardly relative to the pin 20' towards the plate 11, due to gravity, until the arm 22 is in abutment with an end of the slot 15 nearest the arm 21. The arm 22 thus extends parallel to the arm 21.

The arms 21 and 22 then are inserted into the aperture and the tool 10 lowered until the lower abutment surface 13 of the plate 11 abuts the said surface of the block. The grip on the arm 18 then is released and the arm 18 and the handle 27 are gripped simultaneously by a single hand grip whereby the handle 27 is pivoted on the pin 20' towards the arm 18, the pivotal movement being limited by the stud 26. As the handle 27 pivots towards the arm 18, the curved arm 29 pivots relative to the pin 20' in an anticlockwise direction of the pin 20' (when viewed in FIG. 1) thereby pivoting the arm 22 in a clockwise direction of FIG. 1 on the pin 16'. The arm 22 thus pivots away from the arm 21 thereby increasing the distance between the arms 21 and 22 so that the serrated portions 21' and 22' engage portions of an inner wall of the aperture at opposite ends of a diameter thereof. The pressure of the arms 21 and 22 in engagement with the said inner wall is maintained while the handle 27 and the arm 18 are gripped thereby squeezing the handle 27 towards the arm 18. The distance between the arms 21 and 22 is arranged such that the angle through which it is necessary to move the handle 27 in order to ensure that the arms 21 and 22 firmly grip the inner wall of the aperture and thereby firmly engage the tool 10 with the brick is not sufficient that the handle 27 engages the stud 26.

In this manner, the brick can be manipulated by one hand leaving the other hand of a brick layer free to apply mortar to surfaces of the brick during preparation of the brick prior to laying the brick juxtaposed other bricks thereby to construct a wall.

Referring now to FIG. 2 of the drawings, there is shown a tool 40 comprising a handle 41 having an aperture 42 therein and a lower abutment surface 43 for engaging a brick. The lower abutment surface 43 is provided with a slot (not shown) communicating with the aperture 42. The casing 41 has pivotally mounted thereon a pair of arms 44 and 45, such that the arms depend from the abutment lower surface 43 at opposite ends of the slot and diverge from one another in a direction downwardly of the abutment surface 43. The arms 44 and 45 are connected by a helical tension spring 46 biasing the arms 44, 45 towards one another about their pivot axes.

The handle 41 has movably located therein a plate 47 having an aperture 48 which corresponds with the aperture 42 in the handle 41. The plate 47 has a wedge portion 49 extending through the lower slot in the abutment surface 43 and between the arms 44 and 45. The wedge portion 49 diverges in a direction downwardly of the lower abutment surface 43.

In operation, the tool 40 is lowered onto a brick (not shown) having an aperture in a wall thereof, the arms 44, 45 extending into the aperture and the lower abutment surface 43 engaging the wall thereof. The handle 41 then is grasped by one hand only, the fingers of the hand extending through the apertures 42, 48 in the handle 41 and the plate 47. As the grip is tightened on the tool 40, the plate 47 is lifted in the handle 41 thereby raising the wedge portion 49 relative to the arms 44, 45. Since the arms 44 and 45 converge towards the abutment surface 43, and upward movement of the wedge portion 49 causes the diverging portions of the wedge portion 49 to move nearer the abutment surface 43, the arms 44, 45 which are urged towards and in engagement with the wedge portion 49 by the spring 46, are progressively moved apart, thereby engaging the inner wall of the aperture of the brick with progressively increasing force. In this manner, the brick is supported in engagement with the tool 40 and can be manipulated by one hand only as with the embodiment described with reference to FIG. 1.

It will be appreciated that with a tool in accordance with the present invention, large bricks which hitherto could be manipulated only by using two hands, can be manipulated using one hand.

We claim:

1. A tool for lifting a component comprising:
   a support having a contiguous lower abutment surface,
   a plurality of engaging members extending beneath said lower abutment surface and adapted to be entered into a recess in said component wherein at least one of said members is movable, and
   handle means movably connected with said support and operatively connected with said movable engaging member, the members engaging the adjacent wall of the recess with a force proportional to the weight of the component.

2. A tool as claimed in claim 1 characterized by a pair of engaging members which move one away from the other and said handle means includes first and second handle elments upstanding from the support on the side thereof opposite to the engaging members, the first handle portion being fixedly connected with said support and the second handle portion being movable with respect to the first.

3. A tool as characterized in claim 2 wherein the second handle is pivotally connected with the first handle and a detent on the handle is engageable with a crank on the movable engaging member, the arrangement being such as to provide a sliding interconnection therebetween.

4. A tool as claimed in claim 1 characterized by each movable engaging member being pivoted relative to the support and further characterized by wedge means disposed between the members whereby on lifting the slidable handle the wedge means is moved upwardly between the pivoted movable engaging members to urge the same apart to engage the adjacent wall of the recess with a force proportional to the weight of the component 5. A tool as claimed in claim 4 characterized in that the wedge means is integral with the slidable handle.

* * * * *